US012305022B2

(12) United States Patent
Salwiczek et al.

(10) Patent No.: US 12,305,022 B2
(45) Date of Patent: May 20, 2025

(54) POLYAMIDE COMPOSITION

(71) Applicant: Evonik Operations GmbH, Essen (DE)

(72) Inventors: Kathrin Salwiczek, Recklinghausen (DE); Chenyu Ye, Shanghai (CN); Urs Welz-Biermann, Lafayette, IN (US); Klaus Hülsmann, Haltern am See (DE); Fei Teng, Shanghai (CN); Zhisheng Wang, Shanghai (CN); Juan Guo, Shanghai (CN)

(73) Assignee: Evonik Operations GmbH, Essen (DE)

( * ) Notice: Subject to any disclaimer, the term of this patent is extended or adjusted under 35 U.S.C. 154(b) by 765 days.

(21) Appl. No.: 17/595,059

(22) PCT Filed: May 9, 2020

(86) PCT No.: PCT/CN2020/089301
§ 371 (c)(1),
(2) Date: Nov. 8, 2021

(87) PCT Pub. No.: WO2020/228621
PCT Pub. Date: Nov. 19, 2020

(65) Prior Publication Data
US 2022/0195145 A1 Jun. 23, 2022

(51) Int. Cl.
*C08K 7/14* (2006.01)
(52) U.S. Cl.
CPC ..................... *C08K 7/14* (2013.01)
(58) Field of Classification Search
CPC ............ C08K 7/14; C08L 77/00; C08L 77/06
See application file for complete search history.

(56) References Cited

U.S. PATENT DOCUMENTS

| | | |
|---|---|---|
| 6,884,485 B2 | 4/2005 | Baumann et al. |
| 7,491,792 B2 | 2/2009 | Monsheimer et al. |
| 7,582,342 B2 | 9/2009 | Baumann et al. |
| 8,003,201 B2 | 8/2011 | Luetzeler et al. |
| 8,303,873 B2 | 11/2012 | Dowe et al. |
| 8,357,455 B2 | 1/2013 | Baumann et al. |
| 8,470,433 B2 | 6/2013 | Haeger et al. |
| 8,535,811 B2 | 9/2013 | Luetzeler et al. |
| 8,614,005 B2 | 12/2013 | Wursche et al. |
| 8,999,086 B2 | 4/2015 | Bollmann et al. |
| 10,040,938 B2 | 8/2018 | Nitsche et al. |
| 2002/0173596 A1* | 11/2002 | Montanari ............... C08L 77/06 525/432 |
| 2003/0162899 A1 | 8/2003 | Baumann et al. |
| 2005/0014842 A1 | 1/2005 | Baumann et al. |
| 2006/0030692 A1* | 2/2006 | Montanari ............ C09D 177/00 528/310 |
| 2006/0189784 A1 | 8/2006 | Monsheimer et al. |
| 2006/0281873 A1 | 12/2006 | Alting et al. |
| 2007/0036998 A1 | 2/2007 | Dowe et al. |
| 2007/0104971 A1 | 5/2007 | Wursche et al. |
| 2008/0119632 A1 | 5/2008 | Baumann et al. |
| 2008/0166529 A1 | 7/2008 | Hager et al. |
| 2008/0213552 A1 | 9/2008 | Hager et al. |
| 2008/0261010 A1 | 10/2008 | Wursche et al. |
| 2011/0217559 A1 | 9/2011 | Bollmann et al. |
| 2011/0244209 A1 | 10/2011 | Luetzeler et al. |
| 2012/0083558 A1 | 4/2012 | Bayer et al. |
| 2012/0094116 A1 | 4/2012 | Wursche et al. |
| 2014/0037937 A1 | 2/2014 | Wursche et al. |
| 2014/0066561 A1 | 3/2014 | Pfleghar et al. |
| 2014/0363654 A1 | 12/2014 | Roth et al. |
| 2015/0086737 A1 | 3/2015 | Nitsche et al. |
| 2015/0086738 A1 | 3/2015 | Nitsche et al. |
| 2016/0102202 A1 | 4/2016 | Lamberts et al. |
| 2016/0369098 A1 | 12/2016 | Yasuda et al. |
| 2017/0240727 A1 | 8/2017 | Van Der Burgt et al. |
| 2019/0055404 A1 | 2/2019 | Aepli et al. |
| 2021/0371651 A1 | 12/2021 | Salwiczek et al. |

(Continued)

FOREIGN PATENT DOCUMENTS

| | | |
|---|---|---|
| CN | 102459444 | 5/2012 |
| CN | 109337361 | 2/2019 |
| CN | 109401294 | 3/2019 |
| JP | 2008-280483 | 11/2008 |
| JP | 2014-043577 | 3/2014 |
| JP | 2017-531706 | 10/2017 |

OTHER PUBLICATIONS

PA12 Datasheet, Netzch https://polymers.netzsch.com/Materials/Details/23 (Year: 2024).*
PA610 Datasheet, Netzch https://polymers.netzsch.com/Materials/Details/23 (Year: 2024).*
European Search Report dated Dec. 7, 2022, in European Application No. 20806151.5, 9 pages.
U.S. Appl. No. 11/816,595, filed Mar. 25, 2008, 2008/0166529, Haeger et al.
U.S. Appl. No. 11/816,556, filed Jan. 28, 2008, 2008/0261010, Wursche et al.

(Continued)

*Primary Examiner* — Catherine S Branch
*Assistant Examiner* — Olga Lucia Donahue
(74) *Attorney, Agent, or Firm* — Grüneberg and Myers PLLC

(57) ABSTRACT

A polyamide composition contains a) 88.5-98 wt. % of at least one aliphatic polyamide, wherein at least one monomer unit has 10 to 14 carbon atoms, and wherein the aliphatic polyamide is semi-crystalline; and b) 2-11.5 wt. % of an S glass fiber. The weight percentages of a) and b) are based on a total weight of the polyamide composition. The polyamide composition contains neither a polyolefinic impact modifier nor a core-shell modifier. A moulding material containing the polyamide composition is useful, and a moulded article can be produced from the moulding material. A shoe outsole containing the polyamide composition is also useful.

17 Claims, No Drawings

(56) References Cited

U.S. PATENT DOCUMENTS

2022/0025118 A1  1/2022  Baumann et al.

OTHER PUBLICATIONS

U.S. Appl. No. 14/050,901, filed Oct. 10, 2013, 2014/0037937, Wursche et al.
U.S. Appl. No. 11/586,526, filed Oct. 26, 2006, 2007/0104971, Wursche et al.
U.S. Appl. No. 14/489,632, filed Sep. 18, 2014, 2015/0086738, Nitsche et al.
U.S. Appl. No. 17/285,373, filed Apr. 14, 2021, 2021/0371651, Salwiczek et al.
U.S. Appl. No. 17/285,354, filed Apr. 14, 2021, Salwiczek et al.
U.S. Appl. No. 17/414,674, filed Jun. 16, 2021, 2022/0025118, Baumann et al.
International Search Report issued Aug. 12, 2020 in PCT/CN2020/089301, 5 pages.
Written Opinion issued Aug. 12, 2020 in PCT/CN2020/089301, 6 pages.
Hermes et al., U.S. Appl. No. 18/261,649, filed Jul. 14, 2023.
U.S Appl. No. 18/261,649, filed Jul. 14, 2023, Hermes et al.

\* cited by examiner

POLYAMIDE COMPOSITION

CROSS-REFERENCE TO RELATED APPLICATIONS

This application is the National Stage entry under § 371 of International Application No. PCT/CN2020/089301, filed on May 9, 2020, and which claims the benefit of priority to Chinese Application No. PCT/CN2019/086382, filed on May 10, 2019. The content of each of these applications is hereby incorporated by reference in its entirety.

BACKGROUND OF THE INVENTION

Field of the Invention

The present disclosure relates to the field of polymer composition, and particularly to a polyamide composition.

Description of Related Art

Aliphatic polyamides, e.g. those based on PA12, find their applications in a variety of industries. For example, PA12 or similar polyamides can be used to make shoe outsoles. Due to its transparency, the design pattern & colour of the midsole can be seen through the polymer outsole by human eyes.

For this application, it is sometimes desired to have higher stiffness and higher impact strength, to meet requirements regarding mechanical strength and wear resistance. For such reason, glass fibers and impact modifiers are normally added to modify the polyamides. However, the transparency of the polyamides will normally be impaired. From the perspective of aesthetic, it is sometimes desired to keep the transparency when the polyamides are modified to improve the mechanical properties.

US 2014066561 A1 has disclosed polyamide moulding compounds consisting of thermoplastic synthetic, fiber-shaped aggregates, particulate filler material and additives, wherein the thermoplastic synthetic can be a polyamide mixture (e.g. aliphatic polyamide and impact modifiers), and the fiber-shaped aggregates can be high-strength glass fibers (e.g. S-1 and S-2 glass fibers from AGY). The transparency of the moulding compounds is not discussed in the disclosure.

Therefore, transparent polyamide compositions with high mechanical strength are needed. The transparent composition should have a haze value of 57 or less (determined as described in the examples section).

SUMMARY OF THE INVENTION

One objective of the present disclosure is to provide a polyamide composition with high transparency and high mechanical strength without using polyolefinic impact modifier and without using core-shell modifier with butadiene core and methyl methacrylate shell.

This objective of the present disclosure is achieved by a polyamide composition comprising:
 a) 88.5-98 wt. % of at least one aliphatic polyamide, wherein at least one monomer unit has 10 to 14 carbon atoms, and wherein the aliphatic polyamide is semi-crystalline; and
 b) 2-11.5 wt. % of an S glass fiber,
the wt. % of a) and b) being based on a total weight of the polyamide composition, wherein the polyamide composition comprises neither polyolefinic impact modifier, comprising
 35 to 94.9 wt % of ethene-based monomer units,
 5 to 65 wt % of monomer units based on a 1-alkene with 3 to 8 carbon atoms,
 0 to 10 wt % of monomer units based on another olefin, and
 0.1 to 2.5 wt % of monomer units based on an aliphatically unsaturated dicarboxylic acid anhydride, based on the total weight of the polyolefinic copolymer impact modifier,
nor core-shell modifier which comprises the following:
 a core which comprises 60 to 100 wt % of butadiene units and 0 to 40 wt % of styrene units, each based on the total weight of the core, wherein the core makes up 60 to 95 wt % of the core-shell modifier; and
 a shell which comprises 80 to 100 wt % of methyl methacrylate units and 0 to 20 wt % of modifying monomer units, each based on the total weight of the shell, wherein the shell makes up 5 to 40 wt % of the core-shell modifier.

Another objective of the present disclosure is to provide moulding material comprising the polyamide composition of the present disclosure.

A further objective of the present disclosure is to provide moulded articles produced from the moulding material, wherein preferably the moulded article is for use in one of the following sectors: electrical equipment, sports items, optical equipment, sanitary and hygiene items, household equipment, communications technology, automobile technology, energy and drive technology, mechanical engineering, and medical equipment.

A further objective of the present disclosure is to provide a shoe outsole comprising the polyamide composition of the present disclosure.

DETAILED DESCRIPTION OF THE INVENTION

The following description is used merely for illustration but is not to restrict the scope of the disclosure.

By the term "aliphatic polyamide", the present disclosure refers to polyamides with its monomer units being aliphatic. The aliphatic polyamides do not include those produced from aromatic monomers, being aromatic diamine, aromatic dicarboxylic acid, or aromatic aminocarboxylic acid. The aliphatic monomers may be open-chain (linear, branched) or alicyclic. The aliphatic monomers may be saturated or unsaturated.

The aliphatic polyamide according to the present disclosure comprises has on average 10-14 carbon atoms in a plurality of monomer units. The aliphatic polyamide may be producible from a combination of diamine and dicarboxylic acid, from an ω-aminocarboxylic acid and/or the corresponding lactam. The monomer units are therefore the units which derive from lactam, ω-aminocarboxylic acid, diamine or dicarboxylic acid.

To ensure a high transparency, the aliphatic polyamide may be semi-crystalline. Higher crystallinity of polyamide may reduce transparency significantly.

Suitable aliphatic polyamides further include copolyamides which, based on suitable comonomer selection, comply with the proviso that the monomer units comprise on average 10-14 carbon atoms, for example, the copolyamide composed of laurolactam, decanediamine and dodecanedioic acid (co-PA12/1012). As another example, the copolyamide may be copolymer of laurolactam and 10-aminodecanoic acid (co-PA12/10).

It will be appreciated that the polyamide employed herein may also be compounds of appropriate aliphatic polyamides, sufficient mutual compatibility being advantageous.

Preferably, within the aliphatic polyamide, at least one monomer unit has 10 to 14 carbon atoms.

The following polyamides are suitable by way of example:
PA610, PA106;
PA612, PA126;
PA613, PA136;
PA10, PA1010, PA812, PA128, PA614, PA146;
PA1011, PA1110, co-PA11/1010, PA912, PA129, PA813, PA138;
PA11, PA1012, PA1210, PA913, PA139, PA814, PA148, PA616;
PA1112, PA1211, co-PA12/1012, PA1013, PA1310, PA914, PA149;
PA12, PA1212, co-PA12/1212, PA1113, PA1014, PA1410, PA816, PA618;
PA1213, PA1312, PA1114, PA1411, PA1015, PA1510, PA916, PA169, PA817, PA178;
PA13, PA1313, PA1214, PA1412, PA1115, PA1511, PA1016, PA1610;
PA1314, PA1413, PA1215, PA1512, PA1116, PA1611; PA1017, PA1710; and
PA14, PA1414, PA1315, PA1513, PA1216, PA1612, PA1117, PA1711, PA1018, PA1810.

Preferably, the at least one polyamide is selected from the group consisting of PA610, PA106, PA612, PA126, PA613, PA136, PA10, PA1010, PA1011, PA812, PA128, PA11, PA1111, PA1110, PA1012, PA1210, co-PA12/1012, co-PA12/1212, co-PA11/1010, PA913, PA139, PA814, PA148, PA12, PA1212, PA1113, PA1311, PA1014, PA1410, PA915, PA159, PA816, PA168, PA13, PA1313, PA1214, PA1412, PA1115, PA1511, PA1016, PA1610, and combinations thereof.

More preferably, the at least one polyamide is selected from the group consisting of PA613, PA11, PA1012, PA1210, PA12, PA1014, PA1410, PA13, PA1214, PA1412, and combinations thereof.

The content of polyamide in the polyamide composition is preferably 89-98 wt. %, more preferably 90-97.5 wt %, still preferably 91-97 wt. %, even more preferably 91.5-97 wt. %. When the content of polyamide is too high, e.g., more than 98 wt. %, the glass fiber is in a weight percentage less than 2%. Thus, the polyamide composition may suffer from a weak mechanical strength and therefore it may fail to meet some requirements on mechanical properties. When the content of polyamide is too low, e.g., less than 80 wt. %, the glass fiber is in a high concentration. The resultant composition may suffer from high brittleness and low transparency.

The content of glass fiber is preferably 2-11 wt. %, more preferably 2.5-10 wt. %, still preferably 3-9 wt. %, even more preferably 3-8.5 wt-%. In cases in which the content of glass fiber is too high, e.g., more than 15 wt. %, the blend may suffer from significant haze, as well as an increased brittleness.

More preferably, the S glass fiber does not comprise $B_2O_3$ and/or $TiO_2$. And particularly preferably, the S glass fiber does not comprise further oxides.

Preferably, the S glass fiber comprises 64-66 wt. % $SiO_2$, 24-25 wt. % $Al_2O_3$, 9.5-10 wt. % MgO, 0-0.2 wt. % CaO, 0-0.2 wt. % $Na_2O+K_2O$, and 0-0.1 wt. % $Fe_2O_3$, based on the total weight of the glass fiber. Compared to traditional glass, the S glass fiber contains lower content of calcium oxide and alkali oxides, but much higher content of magnesium oxide.

The polyamide composition according to the present disclosure contains neither polyolefinic impact modifier nor core-shell modifier with butadiene core and methyl methacrylate shell as described above. As known in the art, maleic anhydride-modified ethylene-propylene-diene terpolymer (EPDM), polyolefins, styrene block copolymers (SBCs), and core-shell modifier with butadiene core and methyl methacrylate shell are available for impact modification of polyamides and polyesters. The present disclosure avoids usage of such impact modifiers and achieves a polyamide composition with both high mechanical strength and high transparency.

The polyolefinic impact modifiers include, without limitation to, maleic anhydride modified EPDM, maleic anhydride grafted ethylene/propylene rubber, polypropylene, polyethylene, copolymers produced through copolymerization involving ethylene, propylene, butylene, butadiene, styrene, etc.

In order to maintain high transparency, it is preferable that:
the difference in the refractive indices between the polyamide component according to a) and the S glass fiber according to b) at room temperature is less than 0.01, measured according to DIN EN ISO 489:1999 by method A.

These refractive indices are determined to DIN EN ISO 489:1999 by method A (Zeiss Abbe model A instrument, Schott KL 150 B lamp, white cold light source). However, for a particle size in the lower range, for instance below 200 nm and in particular below 160 nm, a high transparency is retained even at a relatively high difference in the refractive indices.

Preferably, the polyamide is transparent with a haze not greater than 60%, more preferably not greater than 50%, measured according to ASTM D1003 on injection moulded test specimens of 3 mm in thickness.

[Additives]

The polyamide composition according to the invention may comprise as constituents, in addition to the components according to a) and b), further additives preferably selected from flame retardants, stabilizers, plasticizers, fillers, nanoparticles, antistats, dyes, pigments, mould-release agents or flow assistants, with an total amount not greater than 10 wt. %, preferably not greater than 5 wt. % based on the total weight of the polyamide composition.

Preferably, the polyamide composition according to the invention consists of the above specified constituents.

[Production and Usages]

The polyamide composition may be produced by melt mixing on suitable kneaders or compounding machines, discharging and comminution. A multiphase system is concerned here where the modifier is present in the polyamide matrix in finely disperse form. The melt mixing is realized according to conventional method in a kneading assembly, discharge generally in the form of a strand/extrudate and comminution generally by pelletizing, crushing, or grinding.

The polyamide composition may be used as major component of a moulding material. However, the moulding material may include one or more minor components, without departing from the scope of the disclosure, as appreciated by those skilled in the art.

The moulding material may be processed into moulded articles by melting and moulding by processes known to those skilled in the art such as selective laser sintering, composite filament fabrication, selective heat sintering, fusion deposition modelling, fused filament fabrication, injection moulding, extrusion, pressing, or rolling.

The moulded articles may be in used in one of the following sectors: electrical equipment, sports items, optical equipment, sanitary and hygiene items, household equipment, communications technology, automobile technology, energy and drive technology, mechanical engineering, or medical equipment. The moulded articles may fulfil flammability requirements of the relevant industries.

The disclosure is illustrated by way of example and comparative examples hereinbelow.

EXAMPLES

The following materials were employed in the reference, the examples (A1 through A6) and the comparative examples (B through H):

Polyamide 1: VESTAMID LX9012, a heat and light stabilized semi-crystalline PA12 moulding composition, commercially available from Evonik Resource Efficiency GmbH;

Polyamide 2: TROGAMID CX9704 nc, a heat and light stabilized amorphous PA PACM12 produced from bis (4-aminocyclohexyl)methane and dodecanedioic acid, commercially available from Evonik Resource Efficiency GmbH;

AGY 544: A S-2 glass fiber with the following composition, 64-66 wt. % $SiO_2$, 24-25 wt. % $Al_2O_3$, 0-0.2 wt. % CaO, 9.5-10 wt. % MgO, 0-0.2 wt. % $Na_2O+K_2O$ and 0-0.1 wt. % $Fe_2O_3$, commercially available from AGY;

CS 7974: An E-glass fiber from LANXESS Deutschland GmbH.

ECS301HP: An E-glass fiber from Chongqing Polycomp International Corp.

Melt mixtures were produced on a Coperion ZSK-26mc co-rotating twin screw extruder, discharged, pelletized to obtain the polyamide compositions according to the recipe indicated in Table 1, wherein the polyamides with/without impact modifier were dry blended and fed into the main port of extruder and then mixed at 250° C., and the glass fibers were fed via a side feeder into the extruder.

The polyamide compositions in pellet form were processed on an injection moulding machine Engel VC 650/200 (melt temperature 240° C.; mould temperature 60° C.) to prepare specimens for mechanical performance tests.

Tensile modulus of elasticity, tensile stress at yield, tensile stress at break and elongation at break were determined by Zwick Z020 materials testing system according to ISO 527, on ISO tensile specimens, type 1A, 170 mm×10 mm×4 mm at a temperature (23±2°) C., relative humidity (50±10)%.

Notched impact strength was determined by CEAST Resil Impactor 6967.000, according to ISO 179/1eA (Charpy) on tensile specimens ISO 527 type 1A which were cut off two ends, 80 mm×10 mm×4 mm at a temperature (23±2)° C., relative humidity (50±10)%.

Hardness (shore D) was determined by Time group shore D hardness tester TH210, according to ISO 868, on tensile specimens ISO 527 type 1A 170 mm×10 mm×4 mm at a temperature (23±2)° C., relative humidity (50±10)%.

The polyamide compositions in pellet form were further processed on an injection moulding machine Engel VC 650/200 (melt temperature 270° C.; mould temperature 50° C.) to prepare specimens for haze value test.

Haze value was determined at 23° C., by Spectrophotometer CM-3600d from KONICA MINOLTA according to ASTM D1003 (CIE C illuminant) on a 3 mm-thickness plate of size 55 mm×30 mm, and haze value was stated in percentage.

Ross flex test was determined by Lab Tech LAB-F2000 cold ross flexing tester, on ross flex specimens 150 mm×20 mm×2 mm, in bending degree 0°-60°-0° for 100,000 turns, at a temperature (23±2)° C., relative humidity (50±10)%. Crack means hairline crack in the specimen's surface. Break means total break of the specimen.

The overall results are shown in Table 1 and 2.

TABLE 1

Recipe and performance

| Components | A1 | A2 | A3 | A4 | A5* | A6* |
|---|---|---|---|---|---|---|
| LX9012 | 96.00% | 94.00% | 92.00% | 90.00% | 88.00% | 85.00% |
| AGY 544 | 4.00% | 6.00% | 8.00% | 10.00% | 12.00% | 15.00% |
| CS7974 | — | — | — | — | — | — |
| ECS301HP | — | — | — | — | — | — |
| CX9704 | — | — | — | — | — | — |
| E-Module (MPa) | 1760 | 2250 | 2550 | 2940 | 3300 | 4140 |
| Tensile stress at yield (MPa) | 50 | 57.3 | 65 | 73 | 80 | 82.7 |
| Tensile strain at yield (%) | 5.6 | 6 | 6.6 | 7.1 | 7.6 | 8.4 |
| Strain at break (%) | 120 | 13 | 12 | 11 | 11 | 10.5 |
| Notched impact strength (kJ/m$^2$) | 12 | 12.4 | 19.5 | 24 | 26 | 27.6 |
| Haze | 41.2 | 53 | 50 | 54 | 58 | 69 |
| Ross flex test | PASS | PASS | PASS | PASS | PASS | CRACK |

*non-inventive

TABLE 2

Recipe and performance

| Components (wt. %) | B* | C* | D* | E* | F* | G* | H* |
|---|---|---|---|---|---|---|---|
| LX9012 | 96.00% | 94.00% | 85.00% | 96.00% | 94.00% | 85.00% | |
| AGY 544 | — | — | — | — | — | — | 8.00 |
| CS7974 | 4.00% | 6.00% | 15.00% | — | — | — | |
| ECS301HP | — | — | — | 4.00% | 6.00% | 15.00% | |

TABLE 2-continued

| | Recipe and performance | | | | | | |
|---|---|---|---|---|---|---|---|
| Components (wt. %) | B* | C* | D* | E* | F* | G* | H* |
| CX9704 | — | — | — | — | — | — | 92.00 |
| E-Module (MPa) | 1710 | 1960 | 3230 | 1750 | 2060 | 3530 | 3010 |
| Tensile stress at yield (MPa) | 44.4 | 49.1 | 69.8 | 47 | 52.6 | 70.4 | 90.5 |
| Tensile strain at yield (%) | 5.2 | 5.3 | 6.8 | 6 | 6.2 | 8.1 | 5.2 |
| Strain at break (%) | 31.9 | 22.3 | 15.5 | 71.9 | 20.6 | 11.4 | 6.1 |
| Notched impact strength (kJ/m$^2$) | 12.5 | 12.5 | 27 | 11.7 | 12.7 | 22.6 | 4.55 |
| Haze @3 mm | 88 | 92 | 98 | 91 | 95 | 98 | 43 |
| Ross flex test | Pass | Pass | Crack | Pass | Pass | Crack | Break |

*non-inventive

The inventive compounds A1 to A4 comprising S glass fiber as from 4% to 10% have high mechanical strength and a low haze value. They all passed the ross flex test.

In contrast, non-inventive compounds have a low transparency due to a high haze value. Furthermore, A6, D, G, and H did not pass the ross flex test.

Various aspects and embodiments are possible. Some of those aspects and embodiments are described herein. After reading this specification, skilled artisans will appreciate that those aspects and embodiments are only illustrative and do not limit the scope of the present disclosure. Embodiments may be in accordance with any one or more of the embodiments as listed below.

EMBODIMENTS

Embodiment 1

A polyamide composition, comprising:
a) 88.5-98 wt. % of at least one aliphatic polyamide, wherein at least one monomer unit has 10 to 14 carbon atoms, and wherein the aliphatic polyamide is semi-crystalline; and
b) 2-11.5 wt. % of an S glass fiber,
the wt. % of a) and b) being based on a total weight of the polyamide composition, wherein the polyamide composition comprises neither polyolefinic impact modifier, comprising
35 to 94.9 wt % of ethene-based monomer units,
5 to 65 wt % of monomer units based on a 1-alkene with 3 to 8 carbon atoms,
0 to 10 wt % of monomer units based on another olefin, and
0.1 to 2.5 wt % of monomer units based on an aliphatically unsaturated dicarboxylic acid anhydride, based on the total weight of the polyolefinic copolymer impact modifier,
nor core-shell modifier which comprises the following:
a core which comprises 60 to 100 wt % of butadiene units and 0 to 40 wt % of styrene units, each based on the total weight of the core, wherein the core makes up 60 to 95 wt % of the core-shell modifier; and
a shell which comprises 80 to 100 wt % of methyl methacrylate units and 0 to 20 wt % of modifying monomer units, each based on the total weight of the shell, wherein the shell makes up 5 to 40 wt % of the core-shell modifier.

Embodiment 2

The polyamide composition according to Embodiment 1, wherein the at least one aliphatic polyamide is selected from the group consisting of PA610, PA106, PA612, PA126, PA613, PA136, PA10, PA1010, PA1011, PA812, PA128, PA11, PA1111, PA1110, PA1012, PA1210, co-PA12/1012, co-PA12/1212, co-PA11/1010, PA913, PA139, PA814, PA148, PA12, PA1212, PA1113, PA1311, PA1014, PA1410, PA915, PA159, PA816, PA168, PA13, PA1313, PA1214, PA1412, PA1115, PA1511, PA1016, PA1610, and combinations thereof.

Embodiment 3

The polyamide composition according to Embodiment 1 or 2, wherein the at least one aliphatic polyamide is selected from the group consisting of PA613, PA11, PA1012, PA1210, PA12, PA1014, PA1410, PA13, PA1214, PA1412, and combinations thereof.

Embodiment 4

The polyamide composition according to any of the preceding Embodiments, wherein the S glass fiber comprises 64-66% $SiO_2$, 24-25% $Al_2O_3$, 9.5-10% MgO, 0-0.2% CaO, 0-0.2% $Na_2O+K_2O$, and 0-0.1% $Fe_2O_3$, based on the total weight of the S glass fiber.

Embodiment 5

The polyamide composition according to Embodiment 4, wherein the S glass fiber does not comprise $B_2O_3$ and/or $TiO_2$, preferably the S glass fiber does not comprise further oxides.

Embodiment 6

The polyamide composition according to any of the preceding Embodiments, wherein the difference in the refractive indices between the at least one aliphatic polyamide and the S glass fiber at room temperature is less than 0.01, measured according to DIN EN ISO 489:1999 by method A.

Embodiment 7

The polyamide composition according to any of the preceding Embodiments, wherein said polyamide is transparent with a haze not greater than 60%, preferably not greater than 50%, measured according to ASTM D1003 on injection moulded test specimens of 3 mm in thickness.

Embodiment 8

The polyamide composition according to any of the preceding Embodiments, further comprising at least one additive preferably selected from a flame retardant, light stabilizer, heat stabilizer, plasticizer, filler, nanoparticle, antistat, dye, pigment, mould-release agent, or flow assistant, with an total amount not greater than 10 wt. %, preferably not greater than 5 wt. %, based on the total weight of the polyamide composition.

Embodiment 9

Moulding material comprising the polyamide composition according to any of the preceding Embodiments.

Embodiment 10

Moulded article produced from the moulding material according to Embodiment 9, preferably for use in one of the following sectors:
electrical equipment, sports items, optical equipment, sanitary and hygiene items, household equipment, communications technology, automobile technology, energy and drive technology, mechanical engineering, and medical equipment.

Embodiment 11

Shoe outsole comprising the polyamide composition according to any of the Embodiments 1-8.

The above description is presented to enable a person skilled in the art to make and use the disclosure and is provided in the context of an application and its requirements. Various modifications to the preferred embodiments will be apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. In this regard, certain embodiments within the disclosure may not show every benefit of the disclosure, considered broadly.

The invention claimed is:
1. A polyamide composition, comprising:
a) 88.5-98 wt. % of at least one aliphatic polyamide, wherein at least one monomer unit has 10 to 14 carbon atoms, and wherein the at least one aliphatic polyamide is semi-crystalline; and
b) 2-11.5 wt. % of an S glass fiber,
wherein the wt. % of a) and b) is based on a total weight of the polyamide composition, wherein the polyamide composition comprises neither
a polyolefinic impact modifier, comprising
35 to 94.9 wt % of ethene-based monomer units,
5 to 65 wt % of monomer units based on a 1-alkene with 3 to 8 carbon atoms,
0 to 10 w1% of monomer units based on another olefin, and
0.1 to 2.5 wt % of monomer units based on an aliphatically unsaturated dicarboxylic acid anhydride, based on the total weight of the polyolefinic copolymer impact modifier;
nor
a core-shell modifier which comprises the following:
a core which comprises 60 to 100 wt % of butadiene units and 0 to 40 w1% of styrene units, each based on a total weight of the core, wherein the core makes up 60 to 95 wt % of the core-shell modifier; and
a shell which comprises 80 to 100 wt % of methyl methacrylate units and 0 to 20 wt % of modifying monomer units, each based on a total weight of the shell, wherein the shell makes up 5 to 40 wt % of the core-shell modifier,
wherein said polyamide composition is transparent with a haze not greater than 60%, measured according to ASTM D1003 on injection moulded test specimens of 3 mm in thickness.

2. The polyamide composition according to claim 1, wherein the at least one aliphatic polyamide is selected from the group consisting of PA610, PA106, PA612, PA126, PA613, PA136, PA10, PA1010, PA1011, PA812, PA128, PA11, PA1111, PA1110, PA1012, PA1210, co-PA12/1012, co-PA12/1212, co-PA11/1010, PA913, PA139, PA814, PA148, PA12, PA1212, PA1113, PA1311, PA1014, PA1410, PA915, PA159, PA816, PA168, PA13, PA1313, PA1214, PA1412, PA1115, PA1511, PA1016, PA1610, and combinations thereof.

3. The polyamide composition according to claim 1, wherein the at least one aliphatic polyamide is selected from the group consisting of PA613, PA11, PA1012, PA1210, PA12, PA1014, PA1410, PA13, PA1214, PA1412, and combinations thereof.

4. The polyamide composition according to claim 1, wherein the S glass fiber comprises 64-66% $SiO_2$, 24-25% $Al_2O_3$, 9.5-10% MgO, 0-0.2% CaO, 0-0.2% $Na_2O+K_2O$, and 0-0.1% $Fe_2O_3$, based on a total weight of the S glass fiber.

5. The polyamide composition according to claim 4, wherein the S glass fiber does not comprise $B_2O_3$ and/or $TiO_2$.

6. The polyamide composition according to claim 5, wherein the S glass fiber does not comprise further oxides.

7. The polyamide composition according to claim 1, wherein the polyamide composition comprises 89-98 wt. % of the at least one aliphatic polyamide and 2-11 wt. % of the S glass fiber.

8. The polyamide composition according to claim 1, wherein the polyamide composition comprises 90-97.5 wt. % of the at least one aliphatic polyamide and 2.5-10 wt. % of the S glass fiber.

9. The polyamide composition according to claim 1, wherein a difference in the refractive indices between the at least one aliphatic polyamide and the S glass fiber at room temperature is less than 0.01, measured according to DIN EN ISO 489; 1999 by method A.

10. The polyamide composition according to claim 1, further comprising at least one additive, with a total amount not greater than 10 wt. %, based on the total weight of the polyamide composition.

11. The polyamide composition according to claim 10, wherein the at least one additive is selected from the group consisting of a flame retardant, a light stabilizer, a heat stabilizer, a plasticizer, a filler, a nanoparticle, an antistat, a dye, a pigment, a mould-release agent, and a flow assistant.

12. The polyamide composition according to claim 10, wherein the polyamide composition comprises the at least one additive in an amount not greater than 5 wt %, based on the total weight of the polyamide composition.

13. A moulding material comprising the polyamide composition according to claim 1.

14. A moulded article produced from the moulding material according to claim 13.

15. The moulded article according to claim 14, wherein the moulded article is an article for electrical equipment, sports items, optical equipment, sanitary and hygiene items, household equipment, communications technology, automobile technology, energy and drive technology, mechanical engineering, or medical equipment.

16. A shoe outsole comprising the polyamide composition, according to claim 1.

17. The polyamide composition according to claim 1, wherein the polyamide composition is transparent with a haze not greater than 50%, measured according to ASTM D1003 on injection moulded test specimens of 3 mm in thickness.

* * * * *

UNITED STATES PATENT AND TRADEMARK OFFICE
CERTIFICATE OF CORRECTION

PATENT NO. : 12,305,022 B2  
APPLICATION NO. : 17/595059  
DATED : May 20, 2025  
INVENTOR(S) : Salwiczek et al.

Page 1 of 1

It is certified that error appears in the above-identified patent and that said Letters Patent is hereby corrected as shown below:

On the Title Page

Item (30), the Foreign Application Priority Data is currently omitted and should read as follows:
-May 10, 2019 (CN) ..................... PCT/CN2019/086382-.

Signed and Sealed this  
Twenty-ninth Day of July, 2025

Coke Morgan Stewart  
*Acting Director of the United States Patent and Trademark Office*